United States Patent [19]

Peng

[11] Patent Number: 5,338,134

[45] Date of Patent: Aug. 16, 1994

[54] GEAR FINISHING HOB

[75] Inventor: Fuhua Peng, Chuangchun, China

[73] Assignee: Jilin University of Technology, Jilin Province, China

[21] Appl. No.: 82,924

[22] Filed: Jun. 25, 1993

[30] Foreign Application Priority Data

Jun. 27, 1992 [CN] China .............................. 92-1-05109.3

[51] Int. Cl.⁵ .............................................. B23F 21/16
[52] U.S. Cl. ............................................. 407/26; 407/23
[58] Field of Search ........................ 407/23, 24, 25, 26, 407/27, 28, 29

[56]  References Cited

U.S. PATENT DOCUMENTS

| | | | |
|---|---|---|---|
| 1,548,931 | 8/1925 | Candee | 407/26 |
| 1,772,634 | 8/1930 | Olson | 407/26 |
| 1,787,590 | 1/1931 | Olson | 407/26 |
| 1,792,548 | 2/1931 | Olson | 407/26 |
| 1,847,054 | 2/1932 | Breuer | 407/26 |
| 2,511,964 | 6/1950 | Boor | 407/26 |
| 3,022,569 | 2/1962 | Wildhaber | 407/29 |

Primary Examiner—William E. Terrell
Attorney, Agent, or Firm—Skjerven, Morrill, MacPherson, Franklin & Friel

[57] ABSTRACT

A finishing gear hob whose shape is of a worm includes a working side with cutting edges K, which are in the form of a continuous equally-rising spaced cylindrical helix, and edges K are formed by the intersection of the rake faces A, i.e. the top surfaces of the worm, and the flanks B, i.e. the working sides of the worm. The number of cutting edges K equals to the thread number i of the worm, where i is a positive integer. The normal pitch $P_n$ of the working side of the worm is equal to the normal base pitch $t_b$ of the machined gear $\pi m_n \cos\alpha_n$ where $m_n$ is the normal module of the machined gear; and $\alpha_n$ is the normal pressure angle at the reference circle of the machined gear. The lead angle $\lambda$ of the helix cutting edge is calculated by the formula $\sin\lambda = (im_n \cos\alpha_n)/2R$ where R is the radius of cylindrical helix cutting edge K, and the helix lead P of the helix cutting edge $P = (i\pi m_n \cos\alpha_n)/\cos\lambda$. This finishing hob is used for high finishing, good for cutting, gives long life, and its cost is low.

13 Claims, 6 Drawing Sheets

GEAR FINISHING HOB

INTRODUCTION OF THE INVENTION

The present invention relates to the gear cutting tool, especially to the finishing hob which is used on the hobbing machine for the finishing of the involute gear, and more particularly to a new hob which is mounted on the hobbing machine continuously to finish the tooth face of the cylindrical involute gear.

In the invention, the finishing hob presented is a worm which has a mounting hole. Its major features are: the cutting section of the finishing hob is composed of a worm; the top face of the worm is the rake face of the cutting tool; the working side of the worm is the flank of the cutting tool; the continuous cylindrical helix which is formed by the intersection of the rake face and flank mentioned above is the cutting edge of the tool. When this finishing hob and machined gear roll relatively, the mentioned edge cuts the involute tooth face continuously and completes the precise machining of the gear.

BACKGROUND OF THE INVENTION

Figure 1:
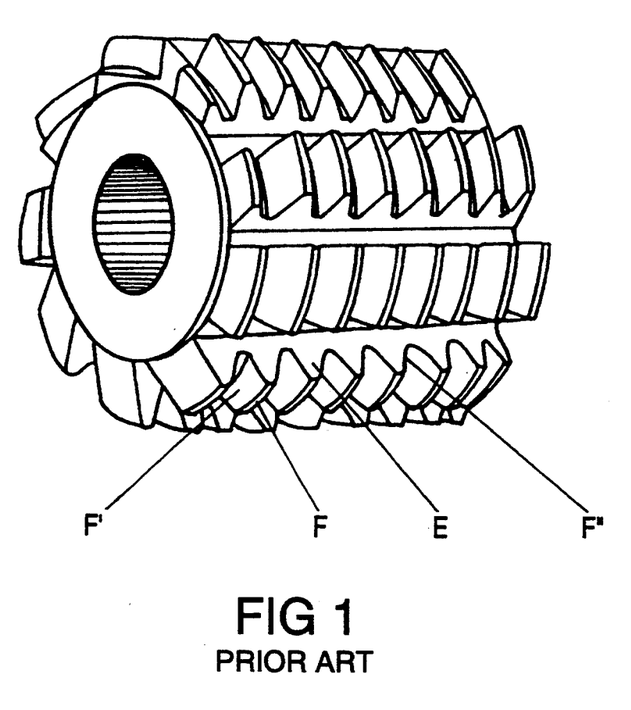
FIG. 1 is the sketch of the prior hob, in which the prior hob appears to be a worm-like tool, in which there are many flutes as well as the top flank F and side flank F', F'' which have been formed by relieving operation.

All the basic configuration of prior hobs (see FIG. 1) is similar to a screw-shaped worm. On the stem of the worm, flutes are made to form the rake face E, and still further relieving is performed to form the top flank F and the side flank F' and F'' which are located at both sides. These side flanks and rake faces intersect to form the cutting edges. Although this kind of hob is very versatile, highly effective, and used widely, most of prior hobs need relieving to produce relief angles and the worm of the hob often adopts the other kinds of worms to replace the involute worm which is required by the theory, which makes the hob itself exist configuration error, and the machined gear error. Moreover, because on the prior hob the flutes are provided by cutting off the helix of the worm for shaping rows of discontinuous teeth, during hobbing there will be a shock. If the gear hob is made of carbide, it is prone to break since the carbide is brittle. And also because the cutting teeth are not continuous, in fact the machined profiles consist of broken lines, this damages the shape of the tooth profile. What is more, on the prior hob the relief angles of the side flanks F' and F'' are very small namely only about 3°, less than a reasonable relief angle of 6°–15°, therefore tool life is pretty low. As for a finishing gear hob, because chips are thin, hob wear appears on the flank mainly, and a relieved hob whose flank was relieved can only be resharpened on the rake face E. The resharpened surface is not reasonable. This is bound to make the allowable resharpening times decrease, and after resharpened tool precision varies. This restricts the allowable number of resharpening and makes the available total life of the hob shorter. It is pretty complex for the prior precise hob both in manufacturing and measuring. And the measuring items are more and strict, and the cost of measurement is rather high.

Therefore, it is the purpose of this invention to present a new precise hob for finishing the cylindrical involute gear to overcome the mentioned shortcomings which are in the prior finishing hobs, on which is provided the continuous spiral cutting edges that can meet the requirement of finishing the cylindrical involute gear, and are especially appropriate for finishing the profile face with high hardness.

SUMMARY OF THE INVENTION

In this invention is introduced a finishing hob which takes the shape of a worm, and whose features are: on the working side of the mentioned finishing hob there are continuous equally-rising spaced cylindrical spiral cutting edges K which consist of intersections of the rake faces A, i.e. the top surfaces of the worm, and the flanks B, i.e. the working sides of the worm, the number of cutting edges K equals the thread number i of the worm, i is a positive integer, the normal pitch $P_n$ of the working side of the worm is equal to the normal base pitch $t_b$ of the machined gear, $\pi m_n \cos\alpha_n$ where $m_n$ is the normal module of the machined gear; and $\alpha_n$ is the normal pressure angle at the reference circle of the machined gear. The lead angle $\lambda$ of the helix cutting edge can be calculated by the formula $\sin\lambda = (i m_n \cos\alpha_n)/2R$ where R is the radius of cylindrical helix cutting edge K and the helix lead p of the helix cutting edge $p = i\pi m_n \cos\alpha_n / \cos\lambda$. The profile in the normal section of the flank B of the mentioned finishing hob which is a spiral surface is a straight line inclined at an angle $\alpha$ to the working side and extends outward in the direction of radius.

The relief angle $\alpha$ of the mentioned finishing hob is to get the suitable value, i.e. $\alpha = 6°–15°$. The rotating generatrix which forms the spiral rake face A of the mentioned finishing hob may be a straight line which is parallel to the center line of the worm, i.e. $\gamma = 0$. The generatrix mentioned above may also be a straight line which extends to the working side and inclines to outside at an angle $\gamma$ in the direction of radius, but the helix leads of the rake face A and the flank B must be equal to each other.

The profile in normal section of the non-working side C of the worm of the mentioned finishing hob (the side C is a spiral surface) is a straight line which extends outward in the direction of radius and inclined at an angle to the working side, that is, its tooth back angle is $2\alpha_c$, and $\alpha_c = \beta + \mu + \eta$ where $\beta$ is the involute angle at the starting point M of effective working section on the machined side profile of the machined gear, $\mu$ is the tooth space angle on the base circle, $\eta$ is the involute angle at the point C of the non-machined side profile, the point C is the intersection of the non-machined side profile of the gear and the tangent of the base circle through the point M.

When the radius of the introduced finishing hob is designed to be enlarged, the radius of cylindrical helix cutting edge K may be $R + \Delta$, where $\Delta$ is limited to be $0 \leq \Delta < \Delta_{max}$ where $\Delta_{max}$ is the width of undercut of the tooth root of the machined gear in the direction of tooth height.

The tooth thickness of the worm of the mentioned finishing hob may be variable, the normal pitch of non-working side of the worm $P_c > P_n$, then it gets a worm with variable-tooth thickness, where $P_c = r_b(tg\alpha_s - tg\alpha_c)$ where $r_b$ is the radius of the machined gear; $\alpha_s = \beta + \mu + \eta' + \tau$, where $\eta'$ is the involute angle at the point S, which is on the opposite non-machined side profile in the tooth space adjacent to where the point C is provided, and point S is the intersection of this non-machined side profile and the tangent of the base circle through point M, and $\tau$ is the center angle of each tooth).

The tooth thickness of the worm of the mentioned finishing hob may be identical as well, the normal pitch of non-working side of the worm $P_c = P_n$, i.e. it is a worm with uniform tooth thickness.

DETAILED DESCRIPTION OF THE PREFERRED EMBODIMENTS

Figure 2:
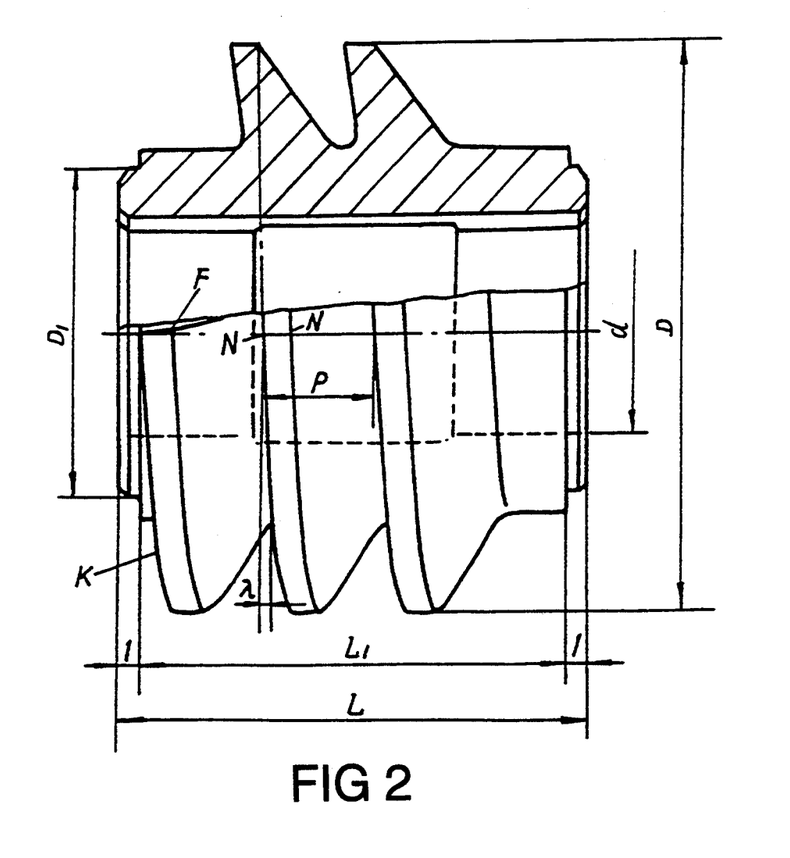
FIG. 2 is the partially sectional view of the finishing hob provided in this invention, and it shows that the tool body of this hob is a worm, and also indicates the major parameters of this hob.

The first embodiment of the finishing hob according to the invention is shown in FIG. 2. The worm of the finishing hob is a single thread. On the working side of the worm is the cutting edge K which is continuous cylindrical helix. The cutting edge K is formed by the intersection of the rake face A, i.e. the top surface of the worm, and the flank B, i.e. the working side of the worm (see FIG. 3). The normal pitch $P_n$ of the working side of the worm equals to the normal base pitch $t_b$ of the machined gear, $\pi m_n \cos\alpha_n$ where $m_n$ is the normal module of the machined gear, $\alpha_n$ is the normal pressure angle at the reference circle of the machined gear, the lead angle is $\lambda$, $\sin\lambda = (m_n \cos\alpha_n)/2R$ where R is the radius of cylindrical helix cutting edge K, the lead of the helix cutting edge $P = (\pi m_n \cos\alpha_n)/\cos\lambda$.

Figure 4A:
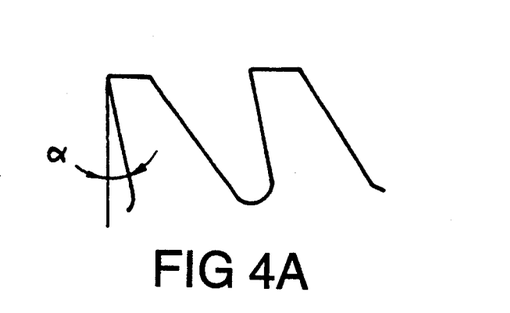
FIG. 4A is the sketch of normal profile of one worm of the finishing hob provided in the invention, showing the profile with the rake angle $r = 0$.

The flank B of the invented finishing hob is a helix surface with a concave-inward angle $\alpha$, i.e., the profile in the normal section of this flank B is a straight line, which extends outwardly and radially and inclines to the working side at an angle of $\alpha$. The angle $\alpha$ the relief angle and can be selected in a range of 6°–15° to meet the required value of a reasonable relief angle. In this embodiment the rake face A of the finishing hob is a cylindrical spiral surface whose generatrix is a straight line parallel to the center line of the worm (see FIG. 4A). In order to avoid the interference of the non-working side C of the worm of the finishing hob with non-machined side profile of the machined gear in machining and to produce the hob conveniently, the non-working side C of the worm is a spiral surface with a straight line in its normal section. The straight line extends outwardly in the direction of radius and inclined with an angle $2\alpha_c$ to the working side, and so the formed tooth back angle is $2\alpha_c$. Here $\alpha_c = \beta + \mu + \eta$ (see FIG. 5), $\beta$ is the involute angle at the starting point M of the effective working section on the machined side profile of the machined gear, $\mu$ is tooth space angle on the base circle, $\eta$ is the involute angle at the point C of the non-machined side profile, and point C is the intersection of the non-machined side profile of the gear and the tangent of the base circle through the point M with an radius of $r_b$.

In this embodiment the normal pitch $P_n$ of non-working side of the worm of the finishing hob is equal to the normal pitch $P_c$ of the working side, i.e. this worm is of equal tooth thickness.

Figure 8:
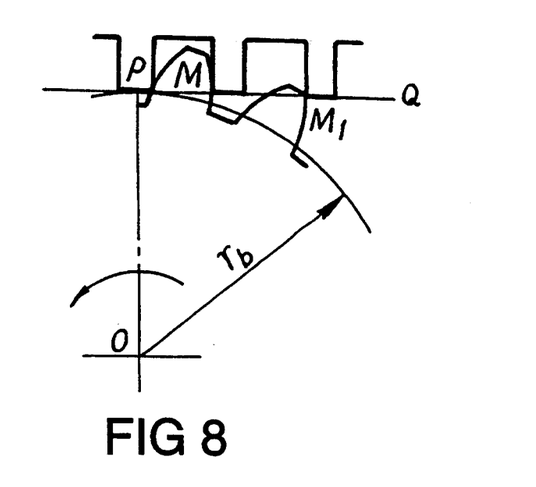
FIG. 8 is a schematic drawing showing the gear's machining in which the rack tool has a profile angle 0°.
Figure 9A:
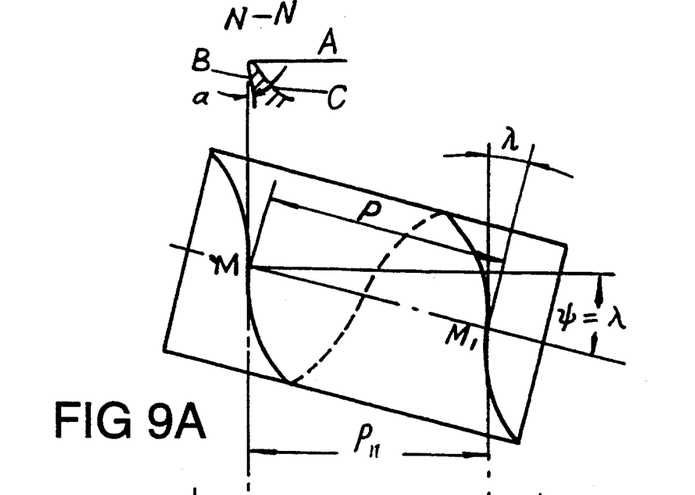
FIG. 9A and FIG. 9B are sketches of constitutional principle of the finishing hob of this invention which are respectively shown by a front view and a vertical view.
Figure 9B:
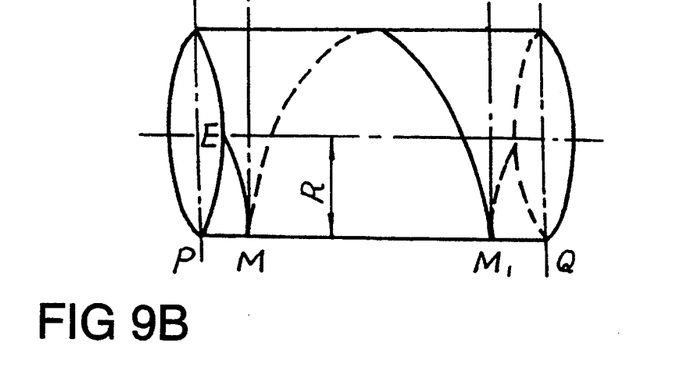
Figure 10:
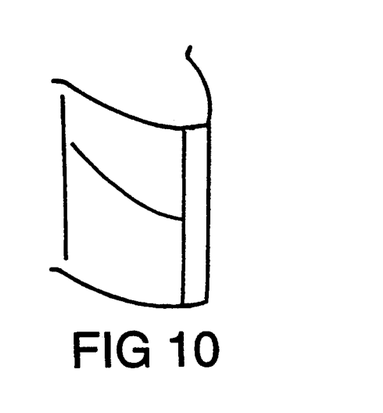
FIG. 10 is the sketch of machining trace on the profile face of the machined gear.

Below is to explain how this finishing hob finishes the tooth face. The finishing hob of a single thread worm is taken as an example, as shown in FIG. 8. When the gear is machined by an imaginary rack-type gear cutter with a profile angle 0°, the base circle of the gear keeps up rolling on the pitch line PQ of the rack completely, and the rack pitch $MM_1 = \pi m_n \cos\alpha_n$ (the normal base pitch of the gear). When the gear rotates uniformly in the direction as shown in the figure, the points M, $M_1$ on the top of the rack which are moving along PQ uniformly to the left will be finishing the right involute profile from top to root of the profile. At this moment the top of the rack is the rake of cutting tool, the tooth side is the flank of the cutting tool. As shown in FIG. 9A, the cutting edge of this finishing hob is a cylindrical helix whose radius and lead are R and $P = (\pi m_n \cos\alpha_n)/\cos\lambda$ respectively. When it is mounted at a slant on the carriage of the hobbing machine at the mounting angle $\psi = \lambda$, the normal pitch $P_n = \pi m_n \cos\alpha_n$, and in FIG. 9B, the projection of the helix of tool edge is a variant cycloid. The tangents of the variant cycloid at points M and M' are perpendicular to the projection of the axis of the hob, and in line with the tooth side of the imaginary rack tool with a profile angle 0°. When the finishing hob rotates uniformly, the points M and $M_1$ are moving along the line PQ uniformly, and keep the center distance in hobbing $A = R + r_b$. The cutting edge of the finishing hob is cutting precisely from the top to root of the gear. But the heights of points M and $M_1$ are different, the cutting trace is inclined from the top to root of the gear tooth as FIG. 10 shows. Obviously on the invented finishing hob itself there is no configuration error.

If the helical gear is cut, the mounting angle $\psi = \lambda \pm \beta_b$ where $\beta_b$ is the base helix angle of the machined gear, "−" is a sign used for the case that the spiral direction of cutting tool and gear is same, "+" sign is for the different spiral direction. It is better for the tool and machined gear to have the same spiral direction.

Figure 7:
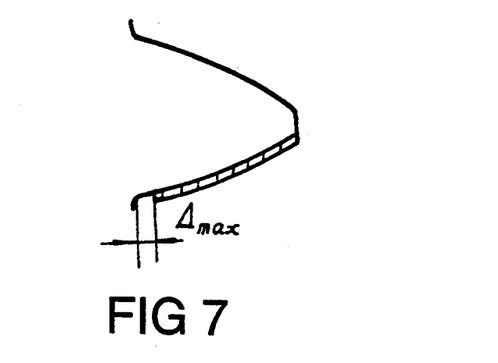
FIG. 7 is the sketch of the distribution of the machining allowance of the machined gear.

In order to get to break the chip, the allowance distribution of the tooth profile is shown in FIG. 7 to have an undercut on the root of gear tooth, and the width of undercut is $\Delta_{max}$, which has a function of "undercut".

Figure 12A:
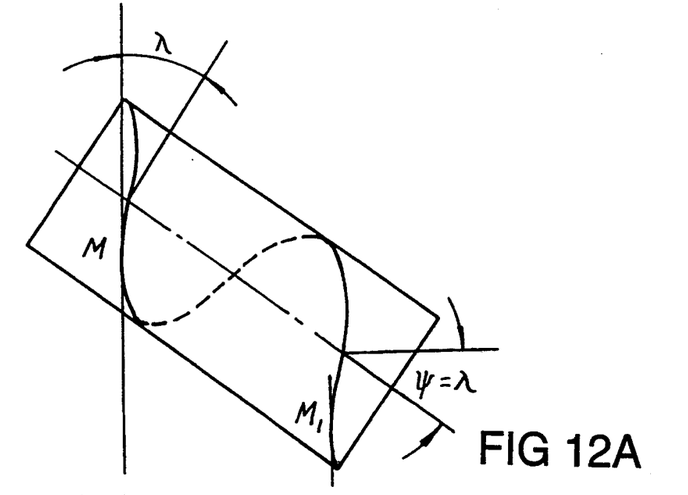
FIG. 12A and FIG. 12B are respectively the front view and top view of the sketch of constitutional principle of the invented finishing hob with enlarged radius.
Figures 12B, 13, 14:
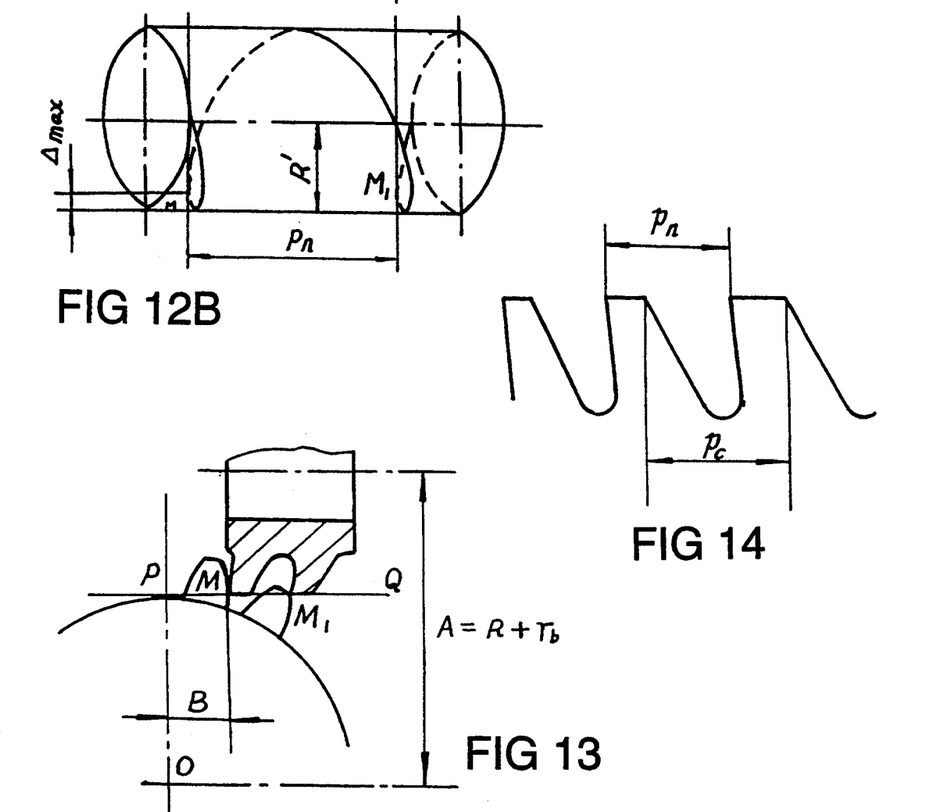
FIG. 13 is the sketch of installation of this invented finishing hob.
FIG. 14 is the sketch of the profile in the normal section of the finishing hob with variable tooth thickness.

The installation parameters of the embodiment of this invention are shown in FIG. 13, where 1. Center distance A: $A=R+r_b$
2. Off-center distance B: $B=\rho_{min}$ ($\rho_{min}=PM$, i.e. the curvature radius of the involute at the beginning point M on the effective working section of the gear profile).
3. Mounting angle $\psi$: $\psi=\lambda\pm\beta_b$ where $\beta_b$ is the the base helix angle of the machined gear (if the machined gear is a spur gear, $\beta_b=0$), where "−" is for the same spiral direction of the tool and machined gear, "+" is for the different spiral direction.

Figure 11:
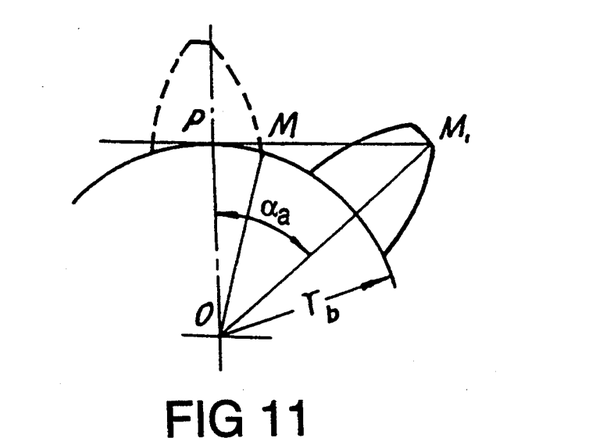
FIG. 11 is the drawing of geometric relationship to calculate the minimum length of the helix of the worm.

In this embodiment of the invention the other constitutional parameters are shown in FIG. 2:

1. Minimum axial length $L_{1min}$ of the thread of the worm (see FIG. 11)

$$L_{1min} = \frac{MM_1}{\cos\psi} = \frac{PM_1 - PM}{\cos\psi} = \frac{(r_b tg\alpha_a - \rho_{min}}{\cos\psi}$$

where $\alpha_a$ is the pressure angle at the top of the machined gear.

Figure 3:
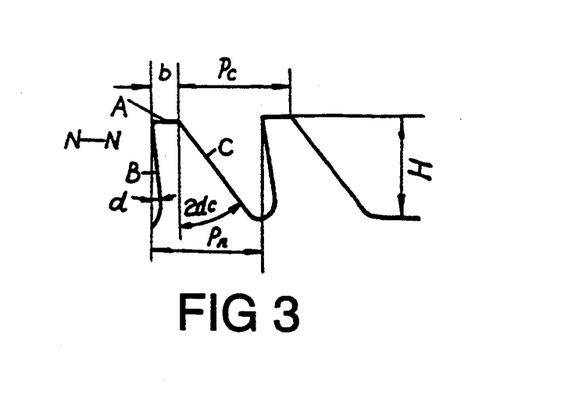
FIG. 3 is the sketch of normal profile section of the finishing hob shown in FIG. 2, in which major parameters are indicated.
Figure 5:
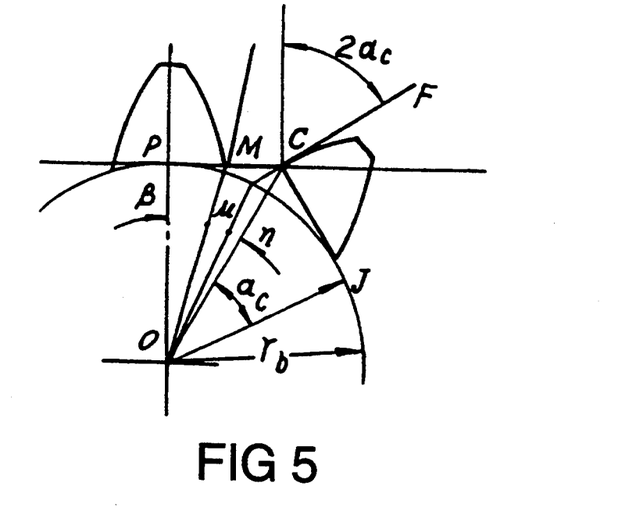
FIG. 5 is the drawing of geometric relationship to calculate the top width of worm tooth and tooth back angle $2\alpha_c$ of the non-working side.

2. Whole depth H of the tooth of the worm (see FIG. 3)
   $H=h$ (h is the whole depth of the gear tooth)
3. Top tooth thickness b of the worm (see FIG. 3 and FIG. 5)

$$b=MC=r_b tg\alpha_c - \rho_{min} - \delta$$

Where $\delta=\delta_1+\delta_2$, $\delta_1$ is the clearance of the non-working side of the tool and the non-machined side of the machined gear; $\delta_2$ is the finishing allowance of non-machined side of the machined gear; if the gear is only finished on one side, then $\delta_2=0$.

4. Hole diameter d, hub diameter $D_1$, hub length L and keyway size etc. are all referred to the design standard of the hob.
5. Selection of hob radius R has to take account of the structure strength, the mounting stiffness of the hob, and no interference in hobbing.

In the embodiment of this invention the flank B of the hob is to be resharpened.

Figure 6:
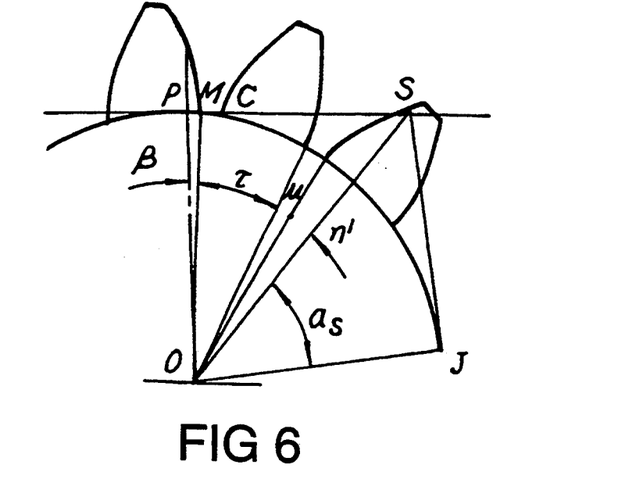
FIG. 6 is the drawing of geometric relationship to the calculate the helix parameters of the non-working side of the worm with variable tooth thickness.

The second embodiment of this invention is similar to the first one, and the difference between them is only in that the normal pitch $P_c$ of non-working side of the worm is larger than the normal pitch $P_n$ of working side of the worm, that is, the worm is of variable-tooth thickness (see FIG. 14). Where $P_c=r_b(tg\alpha_s-tg\alpha_c)$, $r_b$ is the radius of base circle of the machined gear, $\alpha_s=\beta+\mu+\eta'+\tau$, $\eta'$ is the involute angle at the point S on the opposite non-machined side profile in the same tooth space, point S is the intersection of this non-machined side profile and the tangent of base circle through point M, $\tau$ is the center angle of each tooth (see FIG. 6).

In this embodiment the flank B of the hob is resharpened in the same way. After resharpened for many times, the top tooth thickness b of the worm will decrease. Under such condition it is only needed to grind the surface F (see FIG. 2) to regain the original size of the top tooth thickness b of the worm and get the compensation of the cutting edge forward gradually, therefore the number of resharpening can be increased. The number of resharpening will be increased largely, when the number of the thread cycle of the worm of the finishing hob with this structure increases properly.

The third embodiment of the invention is similar to the first one, and their difference is only in that the diameter of cutting tool can increase, (i.e. the radius of the finishing hob can be increased up to $R'=R+\Delta$, where $\Delta$ is limited to $0\leq\Delta<\Delta_{max}$, $\Delta_{max}$ is the width of undercut of tooth root of the machined gear in the direction of tooth height) and the mounting angle is kept as $\psi=\lambda\pm\beta_b$.

The principle of operation of this embodiment is as follows, taking the machining of the spur gear for example (see FIG. 12A, 12B). FIG. 12A is the front view of the finishing hob with an enlarged radius and the mounting angle $\psi=\lambda$. In the top view FIG. 12B, the projection of the helix of the cutting edge is a variant prolate cycloid, and at cutting points M, $M_1$ of radius R it is always the case that the imaginary profile angle is $0°$, and the projection of $MM_1$ equals to $P_n$ and can still machine the profile rightly.

Figure 4B:
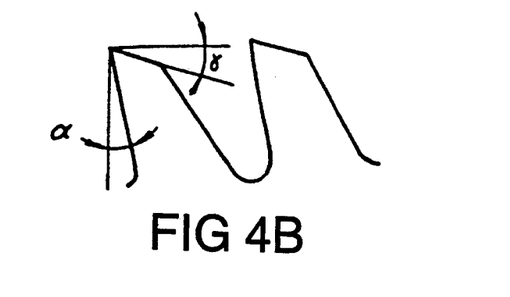
FIG. 4B is the sketch of normal profile of another worm of the finishing hob provided in the invention, showing the profile with a positive rake angle $\gamma$.

As the radius of the hob is enlarged, the rake face of the hob is allowed to be resharpened; when the rake is resharpened, because of $\alpha<2\alpha_c$ ($2\alpha_c$ is the tooth back angle of non-working side, and for machining the standard gear it is about 30°), b will widen. If the rake and flank are resharpened alternatively, the number of resharpening can be increased largely. Besides, it is needed to add that as shown in FIG. 4B if the helix rake takes a positive rake angle $\gamma>0$, the radius of the hob must be enlarged to avoid the case that the radius becomes too small to be used in machining after resharpening the flank.

The advantages of the invented finishing hob are as follow:

1. High precision: there is no configuration error in the design of the cutting tool; the gears manufactured have a smooth and highly accurate involute profile.
2. Beneficial operating conditions: it is an oblique cutting with a large cutting edge inclination; the cutting edge works continuously with no shock; the flank is designed with a reasonable relief angle; tool life is longer.
3. Long tool life: The worm is designed with an enlarged radius and variable tooth thickness to allow the large number of resharpening and long tool life.
4. Low cost: it is convenience to produce, measure and resharpen the hob, and the sharpened surface is reasonable.
5. Convenient to use: can be used on the popular hobbing machines of most of types and specifications, and it is simple to resharpen and set the hob.
6. Highly versatile: it can be used to machine spur gear, helix gear, soft tooth surface; and the tooth surface with mid or high hardness can be machined by the hob of super high speed steel and carbide.
7. Highly economical advantages: the features mentioned above are suitable for many industrial enterprises to adopt (such as cars, trucks, tractors, heavy machines, locomotives, ships, versatile machinery). Its application is promising and comprehensive, and the efficiency in economy is distinguished.

Although the finishing hob of the invention is only used for finishing the single side of the gear tooth, this is enough for the need of the gear which does not need to turn in different directions. As for the gear which need to be finished on both sides of the tooth, turn over the gear and then it is able to machine the other side of the tooth.

In the following are the examples of three sets of major parameters of the invented finishing hob and the machined gear where Example 1 is the second embodiment, Example 2 is the first embodiment and Example 3 is the third embodiment.

ORIGINAL PARAMETERS OF MACHINED GEAR

|  | $m_n$ (mm) | $\alpha_n$ | h (mm) | Z |
|---|---|---|---|---|
| Ex. 1 | 3 | 20° | 6.75 | 17~150 |
| Ex. 2 | 6 | 20° | 13.5 | 17~150 |
| Ex. 3 | 10 | 20° | 22.5 | 17~150 |

DESIGN PARAMETERS OF FINISHING HOB

|  | $M_n$ (mm) | i | P (mm) | Pn (mm) | λ | H (mm) | b (mm) |
|---|---|---|---|---|---|---|---|
| Ex. 1 | 3 | 1 | 8.865 | 8.856 | 2° 29'9" | 6.75 | 3 |
| Ex. 2 | 6 | 1 | 17.730 | 17.713 | 2° 29' | 13.5 | 4.5 |
| Ex. 3 | 10 | 1 | 29.588 | 29.521 | 3° 51' | 22.5 | 7.5 |

|  | Pc (mm) | α | Y | $2\alpha_c$ | d (mm) | D (mm) | D1 (mm) | l (mm) | L1 (mm) | L (mm) |
|---|---|---|---|---|---|---|---|---|---|---|
| Ex. 1 | 9.3 | 10° | 0° | 30° | 32 | 65 | 50 | 5 | 40 | 50 |
| Ex. 2 | 17.713 | 12° | 0° | 30° | 50 | 130 | 75 | 5 | 65 | 75 |
| Ex. 3 | 29.521 | 15° | 0° | 32.5° | 50 | 140 | 80 | 7.5 | 105 | 120 |

What is claimed is:

1. A finishing gear hob, whose shape is worm-like, wherein:
   on the working side of the mentioned finishing hob there are cutting edges K, in the form of a continuous equally-rising spaced cylindrical helix, and wherein edges K are formed by the intersection of the rake faces A, forming the top surfaces of the worm, and flanks B, forming the working sides of the worm; the number of cutting edges K being equal to the thread number i of the worm, where i is a positive integer, the normal pitch $P_n$ of the working side of the worm being equal to the normal base pitch $t_b$ of the machined gear $\pi m_n \cos\alpha_n$, where $m_n$ is the normal module of the machined gear; and $\alpha_n$ is the normal pressure angle at a reference circle of the machined gear, and wherein the lead angle λ of the helix cutting edges is given by the formula $\sin\lambda = (im_n\cos\alpha_n)/2R$ where R is the radius of the cylindrical helix cutting edge K and the helix lead P of the helix cutting edge $P = (i\pi m_n\cos\alpha_n)/\cos\lambda$; and
   wherein the profile in the normal section of the flank B, which is a spiral surface, is a straight line inclined at angle λ to the working side and extends outward in the direction of the radius.

2. A finishing hob as described in claim 1, wherein, the relief angle α of the flank B is in the range of about 6° to about 15°.

3. A finishing hob as described in claim 2, wherein, a generating line of a spiral surface forms the rake face A such that when the rake face A has a cylindrical shape the rake angle γ=0.

4. A finishing hob as described in claim 2, wherein, a rotating generating line of the spiral surface which forms the rake face A is a straight line which extends to the working side and inclines to the outside at an angle γ in the direction of radius, and the helix leads of rake face A and flanks B are equal to each other.

5. A finishing hob as described in claim 2, wherein, the profile in the normal section of a non-working spiral surface side of the worm is a straight line which extends outward in the direction of the radius and is inclined at an angle $2\alpha_c$ to the working side having a tooth back angle of $2\alpha_c$, and wherein $\alpha_c = \beta + \mu + \eta$ where β is the involute angle at a starting point M of an effective working section on the machined side profile of the machined gear, μ is the tooth space angle on the base circle, η is the involute angle at a point C of the non-machined side profile, and wherein the point C is the intersection of the non-machined side profile of the gear and the tangent of the base circle through the point M.

6. A finishing hob as described in claim 2, wherein, the normal pitch of non-working side of the worm $P_c > P_n$, such that the worm has variable-tooth thickness, where $P_c = r_b(tg\alpha_s - tg\alpha_c)$, where $r_b$ is the radius of the base circle of the machined gear, $\alpha_s = \beta + \mu + \eta' + \tau$, η' is the involute angle at the point S on the opposite non-machined side profile in the same tooth space, and point S is the intersection of this non-machined side profile and the tangent of base circle through point M, and τ is the center angle of each tooth.

7. A finishing hob as described in claim 2, wherein, the normal pitch of a non-working side of the worm $Pc = Pn$, is such that the worm has a uniform tooth thickness.

8. A finishing hob as described in claim 1 wherein, the radius of the cylindrical helix cutting edge K is R+Δ, where Δ is limited to $0 \leq \Delta < \Delta_{max}$ where $\Delta_{max}$ is the width of undercut of tooth roof of the machined gear in the direction of tooth height.

9. A finishing hob as described in claim 1 wherein a generating line of a spiral surface forms the rake face A such that when the rake face A has a cylindrical shape the rake angle γ=0.

10. A finishing hob as described in claim 1 wherein a rotating generating line of the spiral surface which forms the rake face A is a straight line which extends to the working side and inclines to the outside at an angle γ in the direction of radius, and the helix leads of rake face A and flanks B are equal to each other.

11. A finishing hob as described in claim 1 wherein the profile in the normal section of a non-working spiral surface side of the worm is a straight line which extends outward in the direction of the radius and is inclined at an angle $2\alpha_c$ to the working side having a tooth back angle of $2\alpha_c$, and wherein $\alpha_c = \beta + \mu + \eta$ where β is the involute angle at a starting point M of an effective working section on the machined side profile of the machined gear, μ is the tooth space angle on the base circle, η is the involute angle at a point C of the non-machined side profile, and wherein the point C is the intersection of the non-machined side profile of the gear and the tangent of the base circle through the point M.

12. A finishing hob as described in claim 1 wherein the normal pitch of a non-working side of the worm $P_c > P_n$, is such that the worm has variable-tooth thickness, where $P_c = r_b(\text{tg}\alpha_s - \text{tg}\alpha_c)$, where $r_b$ is the radius of the base circle of the machined gear, $\alpha_s = \beta + \mu + \eta' + \tau$, $\eta'$ is the involute angle at the point S on the opposite non-machined side profile in the same tooth space, and point S is the intersection of this non-machined side profile and the tangent of base circle through point M, and $\tau$ is the center angle of each tooth.

13. A finishing hob as described in claim 1 wherein the normal pitch of a non-working side of the worm $P_c = P_n$, is such that the worm has a uniform tooth thickness.

* * * * *